(12) United States Patent
Fukushima et al.

(10) Patent No.: US 6,878,093 B2
(45) Date of Patent: Apr. 12, 2005

(54) POWER TRANSMISSION MECHANISM

(75) Inventors: Tatsuya Fukushima, Utsunomiya (JP); Kazuaki Takizawa, Utsunomiya (JP); Eijiro Shimabukuro, Utsunomiya (JP); Katsuhiro Kitamura, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/301,657

(22) Filed: Nov. 22, 2002

(65) Prior Publication Data

US 2003/0104901 A1 Jun. 5, 2003

(30) Foreign Application Priority Data

Dec. 3, 2001 (JP) ........................................ 2001-369388

(51) Int. Cl.$^7$ ............................................... B60K 1/02
(52) U.S. Cl. .............................. 477/3; 477/5; 477/14; 477/102; 74/339
(58) Field of Search .................... 477/3, 5, 14, 102; 74/339

(56) References Cited

U.S. PATENT DOCUMENTS

| | | | | |
|---|---|---|---|---|
| 5,337,848 A | * | 8/1994 | Bader ........................ | 180/65.2 |
| 5,935,040 A | * | 8/1999 | Tabata et al. .................. | 477/3 |
| 6,048,288 A | * | 4/2000 | Tsujii et al. .................... | 477/5 |
| 6,258,006 B1 | * | 7/2001 | Hanyu et al. .................. | 477/5 |
| 6,278,915 B1 | * | 8/2001 | Deguchi et al. .............. | 701/22 |
| 6,432,023 B1 | * | 8/2002 | Ahner et al. .................... | 477/5 |
| 6,488,608 B2 | * | 12/2002 | Yamaguchi et al. ........... | 477/3 |
| 6,640,917 B2 | * | 11/2003 | Maruyama ................. | 180/65.6 |
| 6,645,105 B2 | * | 11/2003 | Kima ............................. | 475/5 |
| 2002/0050259 A1 | * | 5/2002 | Kojima .................... | 123/179.3 |
| 2003/0224902 A1 | * | 12/2003 | Kahlon et al. ................. | 477/3 |

FOREIGN PATENT DOCUMENTS

| | | |
|---|---|---|
| JP | 55-127221 | 10/1980 |
| JP | 2000-289472 | 10/2000 |
| JP | 2002-114048 | 4/2002 |
| JP | 2002-114063 | 4/2002 |
| JP | 2002-526326 | 8/2002 |
| JP | 2002-362197 | 12/2002 |
| WO | WO 00/20243 | 4/2000 |

OTHER PUBLICATIONS

Japanese Office Action dated Jun. 17, 2003 w/translation.

* cited by examiner

*Primary Examiner*—Saul Rodriguez
*Assistant Examiner*—David D. Le
(74) *Attorney, Agent, or Firm*—Westerman, Hattori, Daniels & Adrian, LLP (57) ABSTRACT

The power transmission mechanism reliably starts an internal combustion engine that is stopped during travel of a vehicle. While the internal combustion engine is stopped and the internal combustion engine and the transmission are disengaged by the main clutch, it is determined whether the mode is the EV travel mode, corresponding to the driving mode by the electric motor. In the case of the motor driving mode, and if the vehicle speed is less than a predetermined value, the engine is started in a neutral mode. If the vehicle speed is higher than a predetermined value, the engine is started in a standby mode. When starting in the standby mode, a gear set is selected based on the vehicle speed, and the input shaft and the output shaft are engaged.

7 Claims, 7 Drawing Sheets

POWER TRANSMISSION MECHANISM

BACKGROUND OF THE INVENTION

1. Field of the Invention

The present invention relates to a power transmission mechanism mounted in a hybrid vehicle or the like whose travel is powered by using, for example, an internal combustion engine and an electric motor together, and the driving force of at least one of the internal combustion engine or the electric motor is transmitted to the driving wheels of the vehicle.

2. Description of the Related Art

Figure 7:
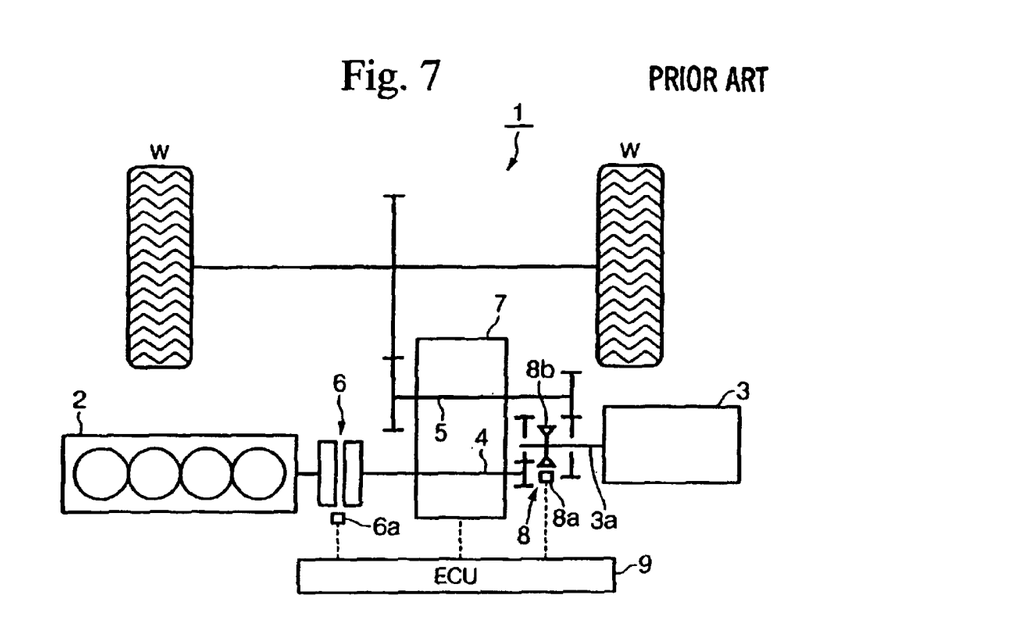
FIG. 7 is a structural drawing of a power transmission according to an example of the conventional technology.

The conventional power transmission mechanism 1 is known such as that shown in FIG. 7 that comprises an internal combustion engine 2, an electric motor 3, an input shaft 4, an output shaft 5, a main clutch 6, a transmission 7, a driving force transmission switching unit 8, and an ECU 9, and the driving force of at least one of the internal combustion engine 2 or the electric motor 3 is transmitted to the drive wheels W and W of the vehicle.

In this power transmission 1, the internal combustion engine 2 communicates with the input shaft 4 of the transmission 7 via the main clutch 6, and the rotation shaft 3a of the electric motor 3 communicates with the output shaft 5 of the transmission 7 via the driving force transmission switching unit 8.

The transmission 7 is an automatic type transmission in which, for example, the transmission operation is controlled by a plurality of gear actuators (not illustrated) being actuated by the ECU 9, and selecting one of a plurality of gear sets (not illustrated) having different gear ratios.

In addition, the driving force transmission switch 8 comprises a switching actuator 8a controlled by the ECU 9 and a switching synchronous clutch 8b actuated by the switching actuator 8a, and, and this forms a switching mechanism that engages or disengages either one of the rotation shaft 3a of the electric motor 3 or the input shaft 4 and the output shaft 5 of the transmission 7 via the switching synchronous clutch 8b.

For example, during start of the internal combustion engine 2 when the vehicle is in a stationary state, the driving force transmission switching unit 8 engages the rotation shaft 3a of the electric motor 3 and the input shaft 4 of the transmission 7, the driving force of the electric motor 3 is transmitted to the internal combustion engine 2, and thereby the internal combustion engine 2 starts. Then, for example, in the EV travel mode in which the vehicle is actuated by the driving force of the electric motor 3, the driving force transmission switching unit 8 engages the rotation shaft 3a of the electric motor 3 and the output shaft 5 of the transmission 7, the driving force of the electric motor 3 is transmitted to the drive wheels W and W, and thereby the vehicle is actuated.

Moreover, in the EV travel mode, for example, the internal combustion engine 2 is stopped, and while the internal combustion engine 2 and the transmission 7 are disengaged by the main clutch 6, the vehicle is actuated by the electric motor 3.

In the case that a start request for the internal combustion engine 2 is generated in the EV travel mode, based on the current velocity of the vehicle and the selectable gear ratios in the transmission 7, the ECU 9 carries out transmission operation in the transmission by actuating the appropriate transmission actuators such that the rotation speed (the rotation speed of the input shaft) NI of the input shaft 4 has a rotation speed equal to or greater than the predetermined start allowing rotation speed #N0 that is the minimum rotation speed for the start of the internal combustion engine 2, and thereby the input shaft 4 and the output shaft 5 are engaged through the transmission 7.

In addition, the ECU 9 starts the internal combustion engine 2 equal to or greater than a predetermined start allowing rotation speed #N0 by actuating the switching actuator 8a of the driving force transmission switching unit 8, engaging the rotation shaft 3a of the electric motor 3 to the output shaft 5 of the transmission 7, actuating the clutch actuator 6a, and engaging the internal combustion engine 2 and the transmission 7 via the main clutch 6.

Figure 8:
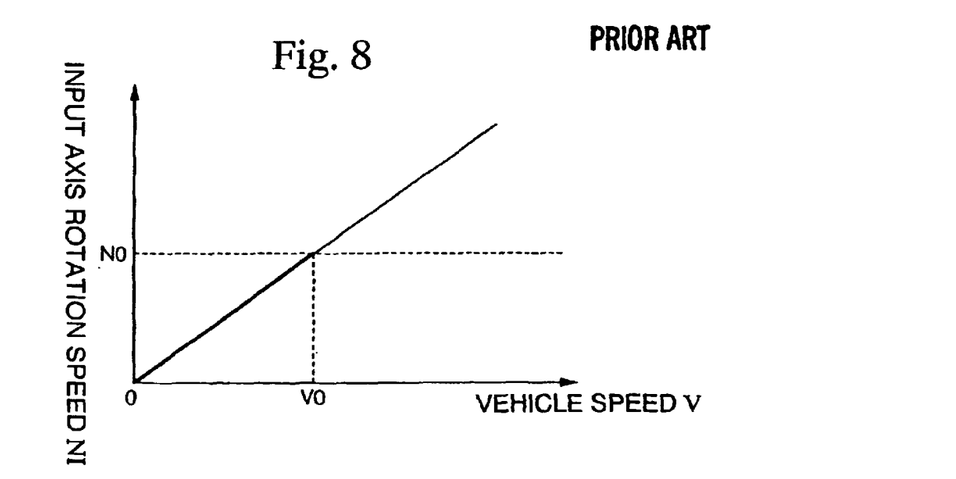
FIG. 8 is a flowchart showing the operation of a power transmission according to an example of the conventional technology, and in particular, of the processing that starts up the internal combustion engine in the EV travel mode.

However, in the power transmission 1 according to the example of the conventional technology described above, as shown, for example, in FIG. 8, the change of the input shaft rotation speed NI that depends on the velocity V of the vehicle (vehicle speed) is set for each of the selectable gear ratios in the transmission 7. Here, for example, in the case that the vehicle speed V is in a very low speed state near zero (for example, less than the minimum velocity V0 shown in FIG. 8), even in the case that any selectable gear ratio in the transmission 7 is selected, the input shaft rotation speed NI cannot be set equal to or greater than the predetermined start allowing rotation speed #N0, and thus there are cases in which the internal combustion engine 2 cannot be started up.

For this problem, in the EV travel mode, a method is known, for example, in which the input shaft 4 and the output shaft 5 are disengaged by setting the transmission 7 to neutral, the rotation shaft 3a of the electric motor 3 and the output shaft 5 are disengaged by the driving force transmission switching unit 8, the rotation shaft 3a and the input shaft 4 are disengaged, and thereby the driving force of the electric motor 3 is transmitted to the internal combustion engine 2, and the internal combustion engine 2 is started up equal to or greater than a predetermined start allowing rotation speed #N0. However, in this case, during the time interval until the start of the internal combustion engine 2 has completed, because the driving force for actuating the vehicle is zero, the vehicle cannot be actuated in response to the requested output from the driver, and there is the problem that the driver is made to feel discomfort towards the behavior of the vehicle.

In consideration of the problems described above, it is an object of the present invention to provide a power transmission mechanism that can reliably start the internal combustion engine of a vehicle that is stopped during travel.

SUMMARY OF THE INVENTION

In order to solve the problems described above and attain the object of the invention, a first aspect of the power transmission mechanism of the present invention, in which at least one of either an internal combustion engine (for example, the internal combustion engine 11 in the embodiments described below) or an electric motor (for example, the electric motor 12 in the embodiments described below) communicate with the drive wheels (for example, the drive wheels W and W in the embodiments described below) to transmit a driving force to the drive wheels, comprises a transmission (for example, the transmission 17 in the embodiments described below) providing an input shaft (for example, the input shaft 14 in the embodiments described below) that engages to the internal combustion engine; an output shaft (for example, the output shaft 15 in the embodiments described below) that engages to the drive wheels, input shaft rotation power transmission members (for example, the start rotation shaft gear 41a, the input side fourth forward gear 34a, and the input side fifth forward gear 35a in the embodiments described below) that are provided on the input shaft, and output shaft rotation power transmission members (for example, the drive output shaft gear 42b, the output side fourth forward gear 34b, and the output side fifth forward gear 35b in the embodiments described below) that are provided on the output shaft, and wherein the input shaft and the output shaft whose gear ratios can be changed stepwise are engaged by selectable meshing between a plurality of transmission gears (for example, the input side first to fifth forward-step gears 31a to 35a and the output side first to fifth forward-step gears 31b to 35b in the embodiments described below) provide on each of the input shaft and the output shaft, and the driving force of the internal combustion engine is transmitted to the drive wheels, or can disengage the input shaft and the output shaft; a first driving force interrupting device (for example, the drive actuator 45 and the drive clutch 46 in the embodiments described below) that can engage at a variable rotation speed ratio the first rotation shaft rotation power transmission member (for example, the drive rotation shaft gear 42a in the embodiments described below) provided on the rotation shaft (for example, the rotation shaft 12a in the embodiments described below) of the electric motor and the output shaft rotation power transmission member provided on the output shaft; a second driving power interrupting device (for example, the start actuator 43 and the start clutch 44 in the embodiments described below) that engages the second rotation shaft rotation power transmission member (for example, the start rotation shaft gear 41a in the embodiments described below) provided on the rotation shaft and the input shaft rotation power transmission member provided on the input shaft, and can transmit the driving power of the electric motor to the internal combustion engine; and a interrupt control device (for example, the ECU 19 in the embodiments described below) that actuates at least one of either the first driving force interrupting device or the second driving force interrupting device.

According to the power transmission having the structure described above, in travel mode, wherein the internal combustion engine is stopped and the drive wheels are actuated by the electric motor, the first rotation shaft rotation power transmission member provided on the rotation shaft of the electric motor and the output shaft rotation power transmission member provided on the output shaft are engaged by the first driving power interrupting device. Here, in the case that a sudden load increase due, for example, to a sudden increase in the acceleration is requested from the driver of the vehicle, or in the case that the remaining capacity of the battery that supplies power to the electric motor falls below a predetermined value, when the start request is generated for the internal combustion engine, the internal combustion engine can be started up by actuating at least one of either the first driving power interrupting deice or the second driving power interrupting device by the interruption control device.

For example, in the case that the current velocity of the vehicle is equal to or greater than a predetermined velocity, while the second driving force interrupting device is not actuated, and with the rotation shaft of the electric motor and the input shaft are disengaged, the rotation shaft of the electric motor and the output shaft are engaged by the first driving force interrupting device, and in the transmission the input shaft and the output shaft are engaged at an appropriate gear ratio. Thereby, the internal combustion engine is started up by transmitting the driving force of the electric motor to the internal combustion engine via the transmission.

In addition, in the case that the current velocity of the vehicle is less than a predetermined velocity, such as near zero, the rotation shaft of the electric motor and the input shaft are engaged by the second driving force interrupting device, and the internal combustion engine is started up by transmitting the driving force of the electric motor to the internal combustion engine via the second rotation shaft rotation power transmission member. Here, when the rotation speed of the electric motor is increased without changing the size of the driving force of the electric motor transmitted to the drive wheels, the rotation shaft of the electric motor and the output shaft can be engaged at a variable transmission rotation speed ratio by the first driving force interrupting device.

Thereby, for example, even in the case that the rotation speed of the electric motor is relatively low, until the rotation speed in the input shaft is equal to or greater than a predetermined start allowing rotation speed that can start the internal combustion engine, the rotation speed of the electric motor can be increased, and the internal combustion engine can be reliably started up without unnecessarily changing the driving force of the electric motor transmitted to the drive wheels or impairing the driving force.

Furthermore, in a second aspect of the power transmission of the present invention, the first rotation shaft rotation power transmission member, the second rotation shaft rotation power transmission member, the input shaft rotation power transmission member, and the output shaft rotation power transmission member are gears or pulleys that transmit power by rotating.

According to the power transmission having the structure described above, by providing gears or pulleys that transmit power by rotating so as to be able, for example, to rotate with respect to the rotation shaft, the input shaft, and the output shaft, the rotation speed ratio with respect to each of the shafts can be easily changed.

Furthermore, in a third aspect of the power transmission of the present invention, the input shaft rotation power transmission member provides an input shaft gear (for example, the start input shaft gear 41b and the input side fourth forward gear 34a in the embodiments described below) that is integral with the input shaft and an input shaft idle gear (for example, the input side fifth forward gear 35a in the embodiments described below) that can rotate with respect to the input shaft, and in which the output shaft rotation power transmission member provides an output shaft gear (for example, the output side fifth forward gear 35b in the embodiments described below) that is integral with the output shaft, and the first driving force interrupting device engages the first rotating axle rotation power transmitting member to the output shaft gear via the input shaft idle gear, and the second driving force interrupting device engages the second rotation shaft rotation power transmission member to the input shaft gear.

According to the power transmission having the structure described above, in the travel mode in which the internal combustion engine is stopped and the drive wheels are actuated by the electric motor, in the case, for example, that the current velocity of the vehicle is equal to or greater than a predetermined velocity, with the second rotation shaft rotation power transmission member and the input shaft gear disengaged, the first rotation shaft rotation power transmission is engaged to the output shaft gear via the input shaft idle gear, and in the transmission the input shaft and the output shaft are engaged at an appropriate gear ratio, and thereby, the internal combustion engine is started up by transmitting the driving force of the electric motor via the transmission to the internal combustion engine.

In addition, in the case that the current velocity of the vehicle is less than a predetermined velocity, such as near zero, the second rotation shaft rotation power transmission member and the input shaft gear are engaged, and the first rotation shaft rotation power transmission member is engaged to the output shaft gear via the input shaft idle gear at a variable rotation speed ratio. Thereby, until the rotation speed on the input shaft becomes equal to or greater than the predetermined start allowing rotation speed, which can start the internal combustion engine, the rotation speed of the electric motor can be increased, and without unnecessarily changing the driving force of the electric motor that transmits to the drive wheels or impairing the driving force, the internal combustion engine can be reliably started.

Furthermore, in a fourth aspect of the power transmission of the present invention, the input shaft rotation power transmission member comprises an input shaft gear (for example, the input side fourth forward gear 34a in the embodiments described below) integrated with the input shaft, and the output shaft rotating force transmission member provides an output shaft gear (for example, the output side fourth forward gear 34b in the embodiments described below) integrated with the output shaft and an output shaft idle gear (for example, the output side fourth forward gear 34b in the embodiments described below) that can rotate with respect to the output shaft, the first driving force interrupting device engages the first rotation shaft rotation power transmission member to the output shaft gear, and the second driving force interrupting device engages the second rotation shaft rotation power transmission member to the input shaft gear via the output shaft idle gear.

According to the power transmission device having the structure described above, in the travel mode in which the internal combustion engine is stopped and the drive wheels are actuated by the electric motor, in the case, for example, that the current velocity of the vehicle is equal to or greater than a predetermined velocity, while the second rotation shaft rotation power transmission member and the input shaft gear are disengaged, the first rotation shaft rotation power transmission member is engaged to the output shaft gear, and in the transmission, by engaging the input shaft and the output shaft at an appropriate gear ratio, the internal combustion engine is started up by transmitting to the internal combustion engine a driving force of the electric motor via the transmission.

In addition, in the case that the current velocity of the vehicle is less than a predetermined velocity, such as near zero, the second rotation shaft rotation power transmission member and the input shaft gear are engaged by the output shaft idle gear, and the first rotation shaft rotation power transmission member is engaged to the output shaft gear at a variable rotation speed ratio. Thereby, until the rotation speed of the input shaft becomes equal to or greater than the predetermined start allowing rotation speed, which can start the internal combustion engine, the rotation speed of the electric motor can be increased, and without unnecessarily changing the driving force of the electric motor that transmits to the drive wheels or impairing the driving force, the internal combustion engine can be reliably started.

Furthermore, in a fifth aspect of the power transmission of the present invention, the input shaft gear is the transmission gear (for example, the input side fourth forward gear 34a in the embodiments described below) provided on the input shaft.

According to the power transmission described above, because the transmission gear according to the transmission operation of this transmission also acts as the engaging action with respect to the second rotation shaft rotation power transmission member, the necessary number of members for the rotation power transmission is decreased, the structure of the power transmission can be simplified, and the cost that is necessary for the structure of the power transmission can be decreased.

A sixth aspect of the power transmission of the present invention provides an engaging/disengaging device (for example, the main clutch 16 in the embodiments described below) that is provided between the internal combustion engine and the transmission, and engages or disengages the internal combustion engine and the transmission; a start-in-neutral device (for example, step S19 to step S20 in the embodiments described below) wherein, in the state in which the driving force of the electric motor is transmitted to the drive wheels by the first driving source interrupting device, and the input shaft and the output shaft are interrupted by the transmission, and the internal combustion engine and the transmission are disengaged by the engaging/disengaging device, and the rotation shaft and the input shaft are engaged by the second driving force interrupting device, the rotation speed of the electric motor is set such that the rotation speed (for example, the input shaft rotation speed NI in the embodiments described below) of the input shaft when the internal combustion engine and the transmission are engaged by the engaging/disengaging device is equal to or greater than a predetermined rotation speed (for example, the start allowing rotation speed #NS in the embodiments described below) that allows start of the internal combustion engine, and the internal combustion engine is started up by engaging the internal combustion engine and the transmission by the engaging/disengaging device, or in the state in which the driving force of the electric motor is transmitted to the drive wheels by the first driving force interrupting device, and the input shaft and the output shaft are disengaged by the transmission, and the internal combustion engine and the transmission are engaged by the engaging/disengaging device, and the rotation shaft and the input shaft are disengaged by the second driving force interrupting device, the rotation speed of the motor is set so that the rotation speed (for example the input shaft rotation speed NI in the embodiments described below) when the rotation shaft and the input shaft are engaged by the second driving force interrupting device is equal to or greater than the a predetermined rotation speed (for example, the start allowing rotation speed #NS in the embodiments described below) that allows the start of the internal combustion engine, and the internal combustion engine is started up by engaging the rotation shaft and the input shaft by the second driving power interrupting device; a transmission control means (for example, step S06 to step S 15 in the embodiments described below) wherein, in a state in which the driving force of the electric motor is transmitted to the drive wheels by the first driving force interrupting device, and the internal combustion engine and the transmission are disengaged by the engaging/disengaging device, the gear ratio is set according to the velocity of the vehicle (for example, the vehicle speed V in the embodiments described below) so that the rotation speed of the input shaft (for example, the input shaft rotation speed NI in the embodiments described below) when the input shaft and the output shaft are engaged by the transmission is equal to or greater than a predetermined rotation speed (for example, the start allowing rotation speed #NS in the embodiments described below) that allows the start of the internal combustion engine, and the input shaft and the output shaft are engaged by the transmission; a standby start device (for example, step S20 in the embodiments described below) wherein, in a state in which the driving force of the electric motor is transmitted to the driving wheels by the first driving force interrupting device and the internal combustion engine and the transmission are disengaged by the engaging/disengaging device, when a start request for the internal combustion engine is generated, the input shaft engaged to the output shaft by the transmission control device at that point in time and the internal combustion engine are engaged by the engaging/disengaging device; and an internal combustion engine start control device that operates by selecting either the start-in-neutral device or the standby start device depending on the velocity of the vehicle.

According to a power transmission having the structure described above, in the travel mode in which the internal combustion engine is stopped and the drive wheels are actuated by the electric motor, depending on the current velocity of the vehicle, the internal combustion engine can be started up by either the start-in-neutral device or the standby start device.

For example, in the case that the current velocity of the vehicle is equal to or greater than a predetermined velocity, the second driving force interrupting device is not actuated by the standby start device, and while the rotation shaft of the electric motor and the input shaft are disengaged, the rotation shaft of the electric motor and the output shaft are engaged by the first driving force interrupting device, and in the transmission, by engaging the input shaft and the output shaft at an appropriate gear ratio, the driving force of the electric motor is transmitted to the internal combustion engine via the transmission.

In this case, the transmission control device sets in advance the gear ratio depending on the velocity of the vehicle so that the rotation speed of the input shaft when the input shaft and the output shaft are engaged by the transmission are equal to or greater than a predetermined rotation speed that slows the start of the internal combustion engine, and by engaging the input shaft and the output shaft via the transmission, a standby state in which the execution of the transmission operation by providing the start of the internal combustion engine is completed.

Thereby, in the case, for example, that a sudden increase in load, such as a sudden acceleration, from the driver of the vehicle is requested, and for example, in the case that the remaining change of the battery that supplies power to the electric motor falls below a predetermined value, when the start request for the internal combustion engine is generated, simply by engaging the internal combustion engine and the transmission via the engaging/disengaging device, the internal combustion engine can be started up immediately. That is, for example, after the start request for the internal combustion engine is generated, the gear ratio is set depending on the velocity of the vehicle, and in comparison to the case of actuating the engaging/disengaging device after executing the transmission operation depending on this gear ratio, the internal combustion engine can be started up more quickly.

In addition, in the case that the current velocity of the vehicle is less than a predetermined velocity, as when close to zero, in the first driving force interrupting device, the rotation shaft of the electric motor, and the output shaft are engaged so that the rotation speed ratio can be varied, the driving force of the electric motor is transmitted to the internal combustion engine in the second driving force interrupting device or the engaging/disengaging device, and thereby the internal combustion engine is started up. In this case, without unnecessarily changing the driving force of the electric motor transmitted to the driving wheels or degrading the driving force, until the rotation speed of the input shaft can become equal to or greater than a predetermined rotation speed that allows the start of the internal combustion engine, the rotation speed of the electric motor can be increased, and the internal combustion engine can be reliable started up.

DETAILED DESCRIPTION OF THE INVENTION

Below, a power transmission according to an embodiment of the present invention will be explained with reference to the figures.

Figure 1:
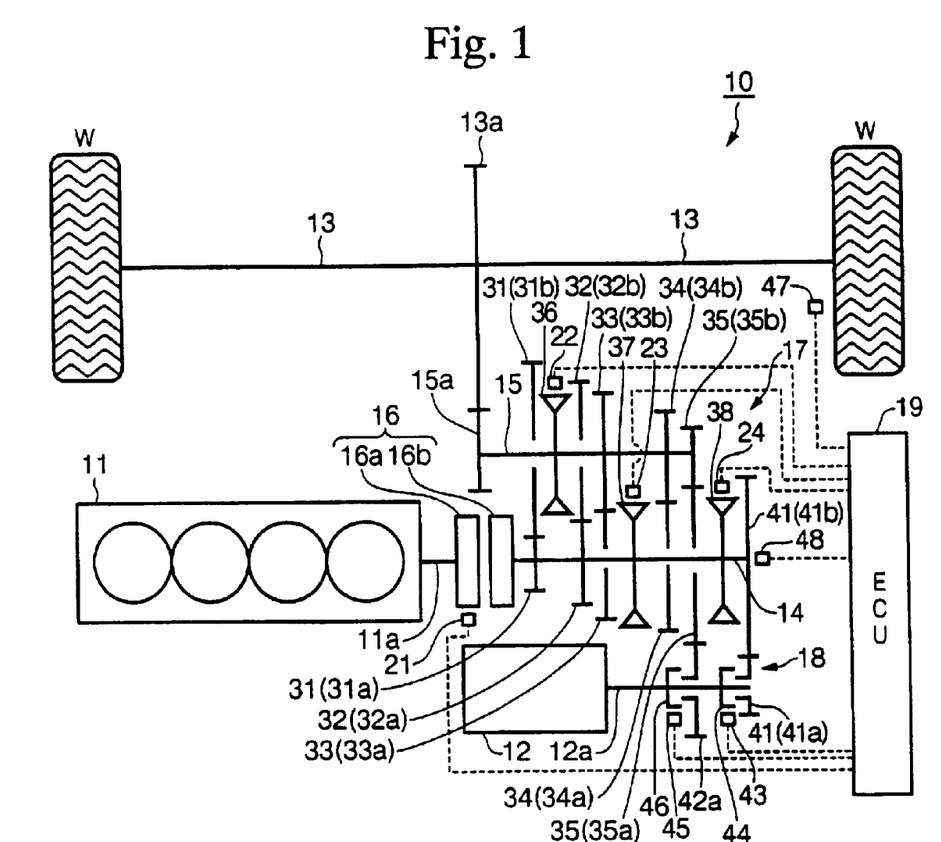
FIG. 1 is a structural diagram of the power transmission according to an embodiment of the present invention.
Figure 2:
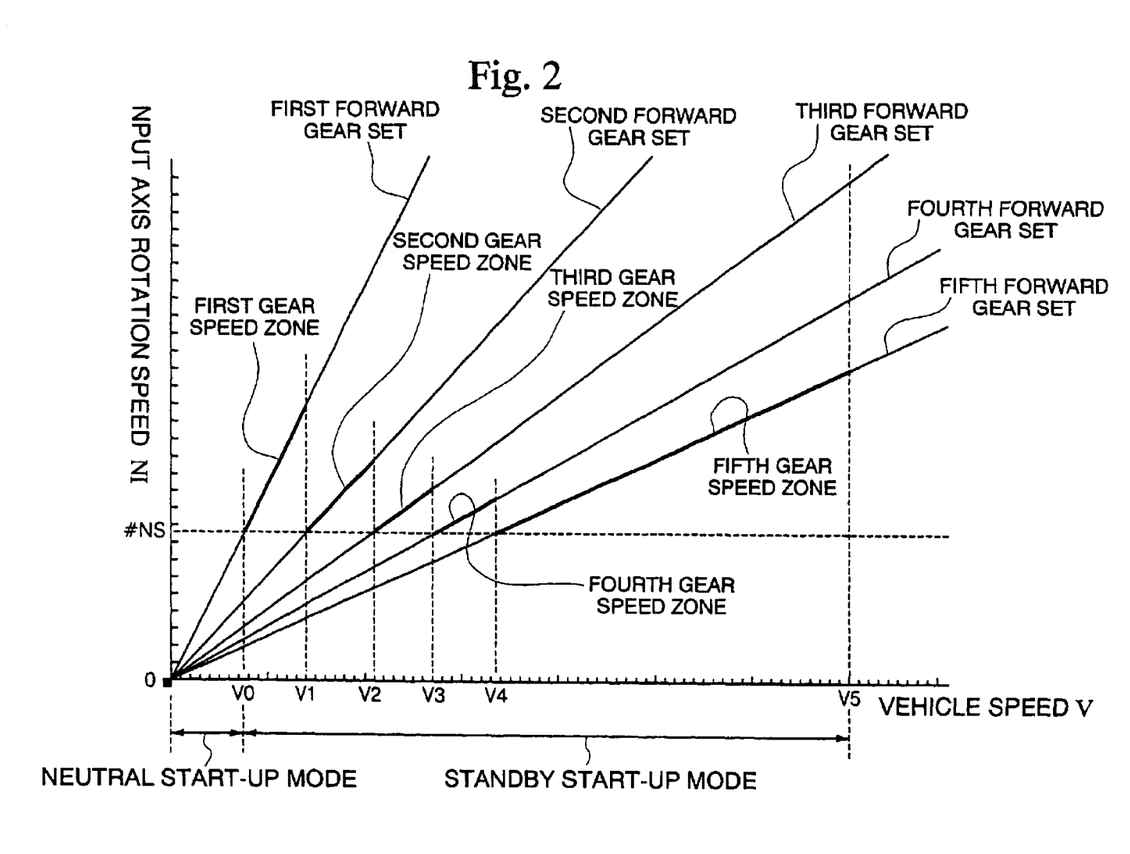
FIG. 2 is a graph showing the relationship between the velocity of the vehicle (vehicle speed) V and the input shaft rotation speed.

FIG. 1 is a structural diagram of the power transmission according to an embodiment of the present invention, and FIG. 2 is a graph showing the relationship between the velocity V of the vehicle (vehicle speed) and the input shaft rotation speed NI.

The power transmission mechanism 10 according to the present embodiment transmits to the drive wheels W and W of the vehicle the driving force of at least either the internal combustion engine 11 or the electric motor 12 mounted for example in a hybrid vehicle, and comprises a transmission that comprises drive shafts 13 and 13 that communicate with each of the wheels W and W, an input shaft 14, an output shaft 15, a main clutch 16, an input shaft 14, and an output shaft 15, and further comprises a motor driving force transmission unit 18, and an ECU (electrical control unit) 19.

Here, the output shaft 15a provided integrally on the output shaft 15 of the transmission 17 is set so as to always mesh with the gear 13a of the differential (not illustrated) engaged to the drive wheels 13 and 13. The internal combustion engine 11 is engaged to the drive wheels W and W via the main clutch 16, the transmission 17, and the drive wheels 13 and 13. The electric motor 12 is mechanically connected to the drive wheels W and W via the motor driving force transmission unit 18, the transmission 17, and the drive wheels 13 and 13.

The main clutch 16 provides the clutch plate 16a engaged to the internal clutch shaft 11a of the internal combustion engine 11 and the clutch plate 16b is engaged to the input shaft 14 of the transmission 17 so as to set with the clutch plate 16a. The clutch actuator 21 is engaged to the main clutch 16. This clutch actuator 21 is electrically connected to the ECU 19, and due to the control of the ECU 19, the internal combustion engine 11 and the transmission 17 are engaged or disengaged by the main clutch 16.

The transmission 17 is an automatic transmission type in which the transmission operation is controlled by each of the actuators 22, 23, and 24 being actuated by the ECU 19.

The transmission 17 comprises, for example, the input shaft 14 that is the main shaft, the output shaft 15 that is the counter shaft, the first to fifth forward gear sets 31, . . . , 35, the reverse gear shaft (not illustrated), and the reverse gear train (not illustrated). In addition, the input shaft 14, the output shaft 15, and the reverse gear shaft (not illustrated) are disposed so as to be parallel to each other.

The first to fifth forward gear sets 31, . . . , 35 are set to gear ratios that differ from each other. The first to fifth forward gear sets 31, . . . , 35 comprise the input side first to fifth forward gears 31a, . . . 35a provided on the input shaft 14 and the output side first to fifth forward gears 31b, . . . , 35b provided on the output shaft 15, and the gears 31a and 31b, . . . , to 35a and 35b that form gear sets are always meshed.

Here, the input side first forward gear 31a and the input side second forward gear 32a are provided integrally on the input shaft 14, and the output side first forward gear 31b that forms a set with the input side first forward gear 31a and the output side forward second gear that form a set with the output side second forward gear 32a serve as an idle gear that can rotate with respect to the output shaft 15, and is engaged to or disengaged from the output shaft 15 by the first and second gear synchronous clutch 36, which is actuated by the first and second gear actuator 22.

The first and second gear actuator 22 is electrically connected to the ECU 19, and due to the control of the ECU 19, through the first and second gear synchronous clutch 36, selectively engages with the output shaft 15 either the output side first forward gear 31b or the output side second forward gear 32b, or disengages both the output side first forward gear 31b and the output side second forward gear 32b from the output shaft 15.

Thereby, the input shaft 14 and the output shaft 15 are engaged or disengaged through the first forward gear set 31 or the second forward gear set 32.

In addition, the output side third forward gear 33b and the output side fourth forward gear 34b are provided integrally on the output shaft 15, and the input side third forward gear 33a that forms a set with the output side third forward gear 33b and the input side fourth forward gear 34a that forms a set with the output side fourth forward gear 34b serve as the idle gear that can vary its rotation with respect to the input shaft 14 and is engaged to or disengaged from the input shaft 14 by the third or fourth speed synchronous clutch 37 that is actuated by the third or fourth speed actuator 23.

The third or fourth gear actuator 23 is electrically connected to the third or fourth gear synchronous clutch 37, and due to the control of the ECU 19, the input shaft 14 is selectively engaged to either the input side third forward gear 33a or the input side fourth forward gear 34a, or both the input side third forward gear 33a and the input side fourth forward gear 34a are disengaged from the input shaft 14 by the third or fourth gear synchronous clutch 37.

Thereby the input shaft 14 and the output shaft 15 are engaged or disengaged by the third forward gear set 33 or the fourth forward gear set 34.

In addition, the output side fifth forward gear 35b is provided integrally on the output shaft 15, and the input side fifth forward gear 35a that forms a set with the output side fifth forward gear 35b acts as an idle gear that can rotate with respect to the input shaft 14, and is engaged to or disengaged from the input shaft 14 by the fifth speed synchronous clutch 38, which is actuated by the fifth speed actuator 24.

In addition, the motor driving force transmission unit 18 is provided on the rotation shaft 12a connected to the electric motor 12, and the motor driving force transmission unit 18 comprises, for example, the start rotation shaft gear 41a and the drive rotation shaft gear 42a, which serve as idle gears, are installed on the rotation shaft 12a so as to be able to rotate, the start actuator 43, the start clutch 44 that is a friction element for actuating the start actuator 43, the drive actuator 45, the drive clutch 46 that acts as a friction element for actuating the drive actuator 45, and the start input shaft gear 41b, which is paired with the start rotation shaft gear 41a and is provided integrally on the input shaft 14.

Specifically, the start rotation shaft gear 41a is engaged to and disengaged from the rotation shaft 12a by the start clutch 44 that is actuated by the start actuator 43. In addition, the drive rotation shaft gear 42a is engaged to and disengaged from the rotating axle 12a so that the rotation speed ratio can be changed by the drive clutch 46 that is actuated by the drive actuator 45.

In addition, the drive rotation shaft gear 42a forms a set with the input side fifth forward gear 35a, which is an idle gear that can rotate with respect to the input shaft 14, and along with the start input shaft gear 41b that forms a set with the start rotation shaft gear 41a, the gears 42a and 35a and the start rotation shaft gear 41a ad the start input shaft gear 41b form sets and are always meshed.

Here, the fifth speed actuator 24 is electrically connected to the ECU 19, and due to the control of the ECU 19, the input side fifth forward gear 35a is engaged to and disengaged from the input shaft 14 by the fifth speed synchronous clutch 38.

In addition, the start actuator 43 is electrically connected to the ECU 19, and due to the control of the ECU 19, the start rotation shaft gear 41a is engaged to and disengaged from the rotation shaft 12a by the start clutch 44.

In addition, the drive actuator 45 is electrically connected to the ECU 19, and due to the control of the ECU 19, the drive rotation shaft gear 42a is engaged to and disengaged from the rotation shaft 12a by the drive clutch 46.

Thereby, the rotation shaft 12a, the input shaft 14, and the output shaft 15, and the rotation shaft 12a, the input shaft 14, and the output shaft 15 are engaged and disengaged.

That is, when the drive rotation shaft gear 42a is engaged with the rotation shaft 12a by the drive clutch 46, the driving force of the electric motor 12 is transmitted in order to the rotation shaft 12a, the drive rotation shaft gear 42a, the input side fifth forward gear 35a, the output side fifth forward gear 35b, and the output shaft 15, and finally to the drive shafts 13 and 13. At this time, when the input side fifth forward gear 35a is connected to the input shaft 14 by the fifth speed synchronous clutch 38, the driving force of the electric motor 12 is transmitted to the drive shafts 13 and 13 and the input shaft 14.

In addition, for example, when the vehicle is stopped and during start of the internal combustion engine 11 in the start-in-neutral mode described below, when the start rotation shaft gear 41*a* is engaged with the rotation shaft 12*a* by the start clutch 44, the driving force of the electric motor 12 is transmitted in sequence to the rotation shaft 12*a*, the start rotation shaft gear 41*a*, the start input shaft gear 41*b*, and finally to the input shaft 14.

The ECU 19 controls the transmission operation of the transmission 17 and the operation of the motor driving force transmission unit 18 by actuating each of the actuators 21, . . . , 24, 43, and 45 depending on the shift manipulation input by the driver and the state of travel of the vehicle.

For example, as will be described below, while the internal combustion engine 11 is stopped and the internal combustion engine 11 and the transmission 17 have been disengaged by the main clutch 16, during EV travel in which the vehicle is actuated by the electric motor 12, ECU 19 controls the transmission operation of the transmission 17 and the operation of the motor driving force transmission unit 18 based on the velocity of the vehicle (vehicle speed) V and the rotation speed (the number of input shaft rotations) NI of the input shaft 14.

Thereby, for example, the signal output from the transmission sensor 47, which detects the vehicle speed V based on the rotation speed of the drive shaft 13, and the signal output from the rotation speed sensor 48, which detects the number of input shaft rotations NI of the input shaft 14, are input to the ECU 19.

For example, during EV travel, when the internal combustion engine 11 and the transmission 17 are disengaged by the main clutch 16 and the input shaft 14 and the output shaft 15 are disengaged by the transmission 17, the drive rotation shaft gear 42*a* is engaged with the rotation shaft 12*a* by the drive clutch 46, and thereby the rotation shaft 12*a* and the output shaft 15 communicate, and the driving force of the electric motor 12 is transmitted to the drive wheels W and W.

Here, the ECU 19 selects one of two start modes for starting up the internal combustion engine 11 depending on the vehicle speed V, that is, selects either the start-in-neutral mode or the start-in-standby mode. In addition, in the case that the start-in-standby mode is selected, in the case that the input shaft 14 and the output shaft 15 are engaged by each of the first to fifth forward gear sets 31, . . . , 35, the input shaft rotation speed NI is equal to or greater than the predetermined start allowing rotation speed #NS, which is the minimum rotation speed for starting up the internal combustion engine 11, and one among the first to fifth forward gear sets 31, . . . , 35 is selected so that the rotation speed is the minimum, and then the input shaft 14 and the output shaft 15 are engaged in advance.

In this case, as shown in FIG. 2, for example, each of the first to fifth forward gear sets 31, . . . , 35 is selected based on the relationship between the vehicle speed V, which is set for each of the first to fifth forward gear sets 31, . . . , 35, and the input shaft rotation speed NI.

For example, the ECU 19 selects the first forward gear set 31 in the case that the vehicle speed V is equal to or greater than a predetermined velocity V0 and less than a predetermined velocity V1 (the first gear speed zone); selects the second forward gear set 32 in the case that the vehicle speed V is equal to or greater than a predetermined velocity V1 and less that a predetermined velocity V2 (second gear speed zone); selects the third forward gear set 33 in the case that the vehicle speed V is equal to or greater than a predetermined velocity V2 and less that a predetermined velocity V3 (the third gear speed zone); selects the fourth forward gear set 34 in the case that the vehicle speed V is equal to or greater than a predetermined velocity V3 and less that a predetermined velocity V4 (the fourth gear speed zone); and selects the fifth forward gear set 35 in the case that the vehicle speed V is equal to or greater than a predetermined velocity V4 and less than a predetermined maximum velocity V5 (the fifth gear speed zone).

Moreover, each of the predetermined velocities V0, . . . , V4 are the vehicle speeds when the input shaft rotation speed NI becomes the predetermined start allowing rotation speed #NS when each of the first to fifth forward gear sets 31, . . . , 35 are selected, and $V0 \leq V1 \leq V2 \leq V3 \leq V4$.

In addition, the predetermined maximum velocity V5 (for example, $V5 \geq V4$) is the maximum velocity that can be attained during the EV travel, which is actuated only by the electric motor 12.

In this start-in-standby mode, in the case, for example, that a sudden load increase due to acceleration or the like is requested by the driver, or in the case, for example, that the remaining charge SOC of the battery falls below a predetermined value, when the start request for the internal combustion engine 11 is generated, the ECU 19 actuates the clutch actuator 21, and the internal combustion engine 11 and the transmission 17 are engaged by the main clutch 16.

In addition, during EV travel, the ECU 19 maintains the state of disengagement between the input shaft 14 and the output shaft 15 by the transmission 17 in the case that the start-in-neutral mode has been selected when the vehicle speed V becomes less than the predetermined velocity V0.

In addition, at the point in time that the start request for the internal combustion engine 11 is generated, the start actuator 43 is actuated, and the start rotation shaft gear 41*a* is engaged with the rotation shaft 12*a* by the start clutch 44, and at the same time, the drive actuator 45 is actuated, and while changing the gear ratio by sliding the drive rotation shaft gear 42*a* with respect to the rotation shaft 12 by the drive clutch 46, the rotation speed of the electric motor 12 is increased.

At this time, the driving force of the electric motor 12 transmitted to the drive shafts 13 and 13 by the rotation shaft 12*a* and the drive rotation shaft gear 42*a* is set, for example, so as to satisfy the required output according to the pressing operation of the acceleration peddle or the like by the driver. That is, the driving force of the vehicle is set so as to decrease due to the drive rotation shaft gear 42*a* sliding with respect to the rotation shaft 12*a*.

In addition, when the input shaft rotation speed NI has become equal to or greater than the predetermined start allowing rotation speed #NS, the ECU 19 actuates the clutch actuator 21, and the internal combustion engine 11 and the transmission 17 are engaged by the main clutch 16.

Moreover, when the internal combustion engine 11 and the transmission 17 are connected by the main clutch 16, the clutch plate 16*a* and the clutch plate 16*b* are gradually engaged, and thereby, it is possible to prevent drastic changes in the driving power of the vehicle from occurring.

Next, the operation of the power transmission mechanism 10 according to an embodiment having the structure described above, in particular, the operation that starts up the internal combustion engine 11 during travel of the vehicle, will be explained with reference to the drawings.

Figure 3:
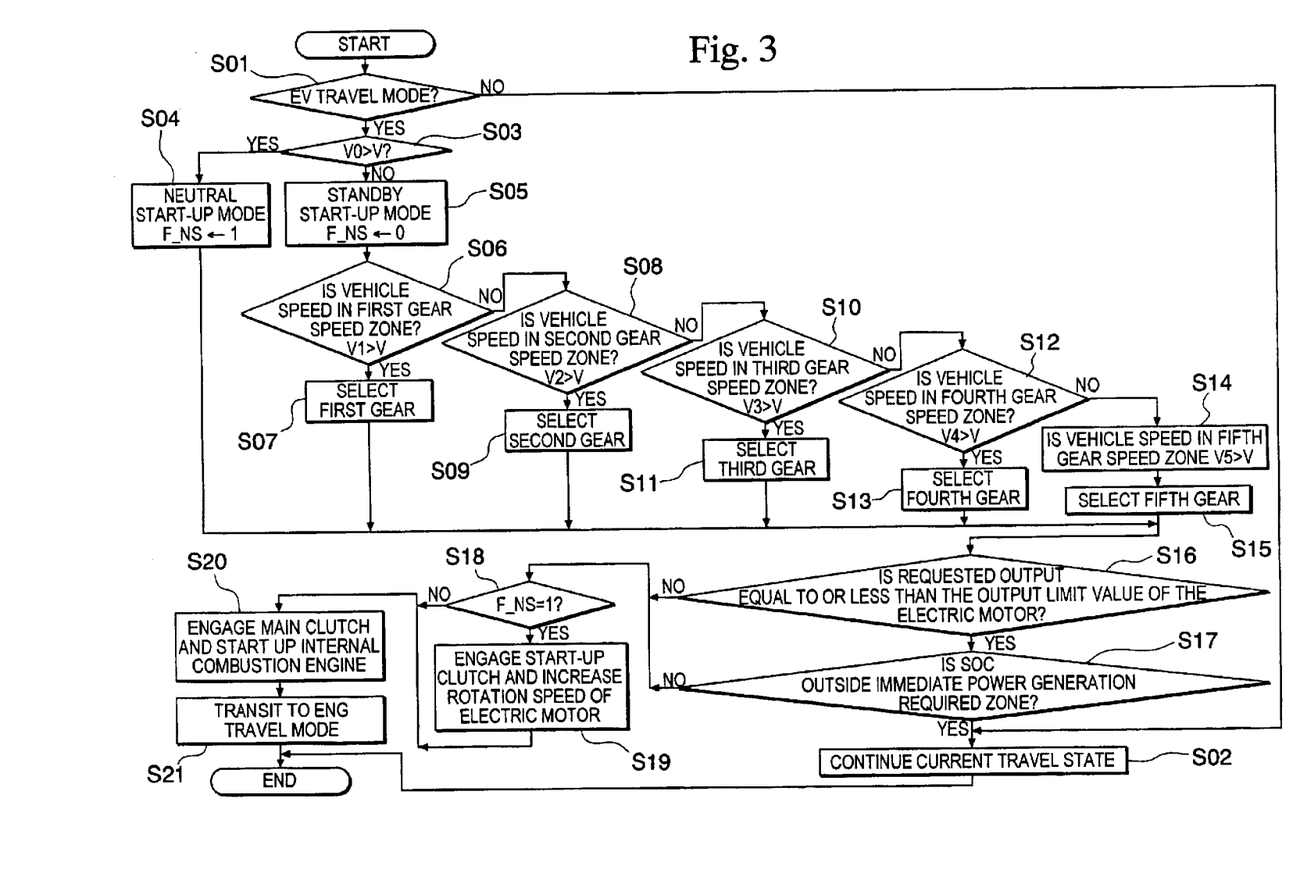
FIG. 3 is a flowchart showing the operation of the power transmission shown in FIG. 1, and in particular, of the processing that starts up an internal combustion engine during travel of the vehicle.

FIG. 3 is a flowchart showing the operation of the power transmission mechanism 10, and in particular, shows the processing that starts-up the internal combustion engine 11 during the travel of the vehicle.

First, in step S01 shown in FIG. 3, while the internal combustion engine 11 is stopped and the internal combustion engine 11 and the transmission 17 are disengaged by the main clutch 16, it is determined whether or not the mode is the EV mode, in which the vehicle is actuated by the electric motor 12.

In the case that the answer is NO, the processing proceeds to step S02, the travel state at this point in time is continued, and the sequence of the processing ends.

In contrast, in the case that the result of the determination is YES, the processing proceeds to step S03.

In step S03, it is determined whether or not the vehicle speed V is less than a predetermined vehicle speed V0.

In the case that the result of the determination is YES, that is, in the case that even if any gear ratio that can be selected in the transmission 17 is selected, the input shaft rotation speed NI cannot be set equal to or greater than a predetermined start allowing rotation speed #NS, the processing proceeds to step S04, the flag value of the start-in-neutral mode flag F_NS, which represents the selection of the start-in-neutral mode, is set to 1, and the flow proceeds to step S16, which will be explained below.

In contrast, in the case that the result of the determination is NO, the processing proceeds to step S05.

In step S05, the start-in-standby mode is selected, and the flag value of the start-in-neutral mode flag F_NS is set to 0.

Then, in step S06, it is determined whether or not the vehicle speed V is less than a predetermined velocity V1.

In the case that the result of the determination is NO, the flow proceeds to step S08.

In contrast, in the case that the result of the determination is YES, that is, in the case that the vehicle speed V is in the first gear speed zone, the processing proceeds to step S07, the first forward gear set 31 is selected, and thereby the input shaft 14 and the output shaft 15 are engaged. Then the processing proceeds to step S16, described below.

In step S08, it is determined whether or not the vehicle speed V is less that a predetermined velocity V2.

In the case that the result of the determination is NO, the flow proceeds to step S10.

In contrast, in the case that the result of the determination is YES, that is, in the case that the vehicle speed V is equal to or greater than a predetermined velocity V1 and is in the second gear speed zone, which is less than the predetermined velocity V2, the flow proceeds to step S09, the second forward gear set 32 is selected, and thereby the input shaft 14 and the output shaft 15 are engaged. Then the processing proceeds to step S16, described below.

In step S10, it is determined whether or not the vehicle speed V is less than a predetermined velocity V3.

In the case that the result of the determination is NO, the processing proceeds to step S12.

In contrast, in the case that the result of the determination is YES, that is, in the case that the vehicle speed V is equal to or greater than a predetermined velocity V2 and is in the third gear speed zone, which is less than a predetermined velocity V3, the processing proceeds to step S11, the third forward gear set 33 is selected, and thereby the input shaft 14 and the output shaft 15 are engaged. Then the processing proceeds to step S16.

In step S12, it is determined whether or not the vehicle speed V is less than a predetermined velocity V4.

In the case that the result of the determination is NO, the processing proceeds to step S14.

In contrast, in the case that the result of the determination is YES, that is, in the case that the vehicle speed V is equal to or greater than a predetermined velocity V3 and is in the fourth gear speed zone, which is less than a predetermined velocity V4, the processing proceeds to step 13, the fourth forward gear set 34 is selected, and thereby the input shaft 14 and the output shaft 15 are engaged. Then the processing proceeds to step S16, described below.

In step 14, it is determined that the vehicle speed is equal to or greater than a predetermined velocity V4 and is in the fifth gear speed zone, which is less than the predetermined maximum velocity V5 that allows attaining the EV travel mode, the processing proceeds to step S15, the fifth forward gear set 35 is selected, and thereby the input shaft 14 and the output shaft 15 are engaged. Then the processing proceeds to step S16.

In step S16, it is determined whether or not the required output of the pressing operation of the acceleration peddle by the driver is equal to or less than a predetermined limiting value that allows output by the electric motor 12.

In the case that the result of the determination is NO, the processing proceeds to step S18, described below.

In contrast, in the case that the result of the determination is YES, the processing proceeds to step S17, and it is determined whether or not the remaining capacity SOC (state of charge) of the battery (not illustrated) that supplies electrical power to the electric motor 12 is outside an immediate power generation requirement zone.

In the case that the result of the determination in step S17 is YES, the processing proceeds to step S02, described above, in the case that, for example, the remaining capacity SOC of the battery is sufficiently charged so as not to request power generation.

In contrast, in the case that the result of the determination in step S17 is NO, in the case that the battery must be charged by power generation because, for example, the remaining capacity SOC of the battery has fallen, the processing proceeds to step S18.

Specifically, in the EV travel mode, for example, in the case, for example, that a sudden increase in load is required due to a sudden acceleration, or in the case, for example, that the remaining charge SOC of the battery fallen below a predetermined value, the processing proceeds to step S18.

In step S18, it is determined whether or not the flag value of the start-in-neutral mode flag F_NS is 1.

In the case that the result of the determination is NO, the processing proceeds to step S20, described below.

In contrast, in the case that the result of the determination is YES, the processing proceeds to step S19, the start actuator 43 is actuated, the start rotation shaft gear 41a is engaged to the rotation shaft 12a by the start clutch 44. At the same time, the drive actuator 45 is actuated, and while changing the gear ratio by the drive rotation shaft gear 42a sliding with respect to the rotation shaft 12a due to the drive clutch 46 until the input shaft rotation speed NI becomes equal to or greater than a predetermined start rotation speed #NS, the rotation speed of the electric motor 12 is increased.

Then in step S20, the clutch actuator 21 is actuated, the internal combustion engine 11 and the transmission 17 are engaged by the main clutch 16, and thereby the internal combustion engine 11 is started up at a rotation speed equal to or greater than a predetermined start allowing rotation speed #NS.

In addition, in step S21, the vehicle transmits to the ENG travel mode that drives the vehicle by transmitting the driving force of the internal combustion engine 11 to the drive wheels W and W, and the sequence of processing ends.

For example, in the EV travel mode, in the case that the fifth forward gear set 35 is selected, when the vehicle speed V falls and is less than a predetermined velocity V4 and in the fourth gear speed zone, which is equal to or greater than a predetermined velocity V3, with the fifth forward gear set 35, the input shaft rotation speed NI becomes less than a predetermined start allowing rotation speed #NS, and the internal combustion engine 11 can be started up.

Thereby, the input shaft 14 and the output shaft 15 are engaged by selecting the fourth forward gear set 34, in which the input shaft rotation speed NI becomes equal to or greater than a predetermined start allowing rotation speed #NS.

Thereby, when a start request for the internal combustion engine 11 is generated, simply by actuating the clutch actuator 21 and engaging the internal combustion engine 11 with the transmission 17 by the main clutch 16, the internal combustion engine 11 can be started up.

Furthermore, when the vehicle speed V falls and becomes less than a predetermined velocity V0, even if one among the first to fifth forward gear sets 31, . . . , 35 is selected, the input shaft rotation speed NI becomes less than a predetermined start allowing rotation speed #NS, and the internal combustion engine 11 cannot be started up.

Thus, at the point in time that the input shaft 14 and the output shaft 15 are disengaged by the transmission 17 and a start request for the internal combustion engine 11 is generated, the start rotation shaft gear 41*a* is engaged with the rotation shaft 12*a*, and the driving force of the electric motor 12 is transmitted to the input shaft 14. At the same time, while the drive rotation shaft gear 42*a* slides with respect to the rotation shaft 12*a* such that the driving force of the vehicle does not change unnecessarily, the rotation speed of the electric motor 12 is increased until the input shaft rotation speed NI becomes equal to or greater than a predetermined start allowing rotation speed #NS.

Then the clutch actuator 21 is actuated, the internal combustion engine 11 and the transmission 17 are engaged by the main clutch 16, and thereby the internal combustion engine 11 can be started up without unnecessarily changing the driving force of the vehicle or impairing the driving force.

As described above, according to the power transmission mechanism 10 of the present embodiment, even for example in the EV travel mode, in which the vehicle speed V is at an extremely low speed near zero, by selecting the start-in-neutral mode, in which the drive rotation shaft gear 42*a* can be engaged with the rotation shaft 12*a* at a variable rotation speed ratio, without changing the driving force of the vehicle unnecessarily or impairing the driving force, the internal combustion engine 11 can be reliably started up by the electric motor 12.

Furthermore, in the EV travel mode, in which the vehicle speed V is equal to or greater than a predetermined velocity V, the start-in-standby mode is selected, and without sliding the drive clutch 46, the internal combustion engine 11 can be reliably started up by the electric motor 12, and the durability of the drive clutch 46 can be increased.

However, in the start-in-standby mode, when the state becomes a standby state in which the execution of the transmission operation has completed and the start request for the internal combustion engine 11 has been generated, simply by actuating the clutch actuator 21 and engaging the internal combustion engine 11 and the transmission 17 by the main clutch 16, the internal combustion engine 11 can be started up. Thereby, the internal combustion engine 11 can be quickly started up in comparison to the case, for example, in which any one among the first to fifth forward gear sets 31, . . . , 35 is selected after the start request for the internal combustion engine 11 has been generated and the clutch actuator 21 is actuated after carrying out the transmission operation.

Moreover, in the embodiment described above, during EV travel (for example, the EV travel mode), while the internal combustion engine 11 is stopped and the internal combustion engine 11 and the transmission 17 are disengaged by the main clutch 16, the vehicle is actuated by the electric motor 12, but the invention is not limited thereby. For example, during EV travel (or the EV travel mode), while the internal combustion engine 11 is stopped and the internal combustion engine 11 and the transmission 17 are engaged by the main clutch 16, the vehicle can be actuated by the electric motor 12.

In this case, when the vehicle speed V becomes equal to or greater than a predetermined velocity V0, the ECU 19 selects the normal start mode instead of the start-in-standby mode.

In this normal start mode, after the start request for the internal combustion engine 11 is generated, the transmission operation in steps S06 to step S15 described above are executed, and the input shaft 14 and the output shaft 15 are engaged.

That is, at the point in time when the input shaft 14 and the output shaft 15 are engaged in the transmission 17, the internal combustion engine 11 is started up at a rotation speed equal to or greater than a predetermined start allowing rotation speed #NS.

In contrast, in the start-in-neutral mode, in which the vehicle speed V is less than predetermined velocity V0, first the state in which the input shaft 14 and the output shaft 15 are disengaged by the transmission 17 is maintained.

In addition, at the point in time that the start request for the internal combustion engine 11 is generated, the ECU 19 maintains the state in which the start rotation shaft gear 41*a* is disengaged from the rotation shaft 12*a* by the start clutch 44, and at the same time actuates the drive actuator 45, and while changing the rotation speed ratio by sliding the drive rotation shaft gear 42*a* with respect to the rotation shaft 12*a* using the drive clutch 46, increases the rotation speed of the electric motor 12.

In addition, when the start rotation shaft gear 41*a* and the rotation shaft 12*a* are engaged, until the input shaft rotation speed NI becomes equal to or greater than a predetermined start allowing rotation speed #NS, the rotation speed of the electric motor 12 increases. At this point in time, the start actuator 43 is actuated, and the start rotation shaft gear 41*a* is engaged to the rotation shaft 12*a* by the start clutch 44.

At this time, by gradually engaging the start clutch 44, it is possible to prevent a rapid change from occurring in the driving force of the vehicle.

Moreover, in the present embodiment, in addition to each of the input side first to fifth forward gears 31*a*, . . . , 35*a* according to the transmission operation in the transmission 17, a start input shaft gear 41*b* unrelated to the transmission operation is provided, but this is not limiting. For example, in the structural diagram of the power transmission 50 according to a first modification of the present embodiment shown in FIG. 4, the start input shaft gear 41*b* that is unrelated to the transmission operation can be omitted.

Figure 4:
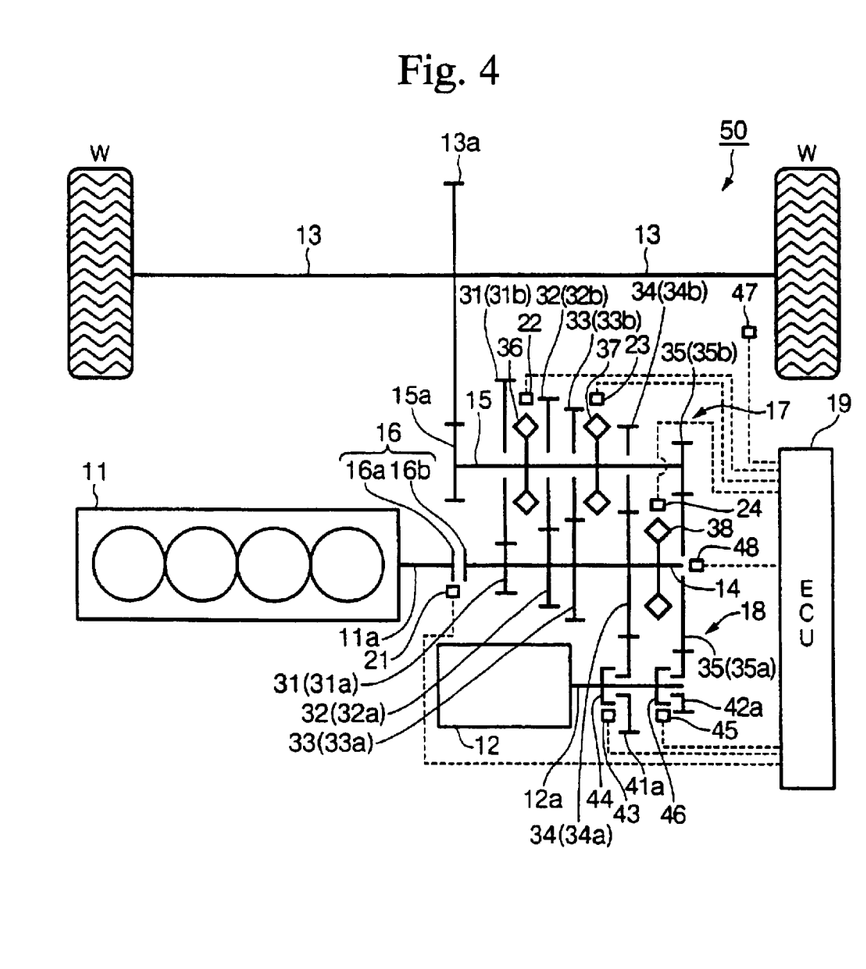
FIG. 4 is a structural drawing of the power transmission according to a first modification of the present embodiment.

Below, the power transmission 50 according to a first modification of the present embodiment will be explained with reference to the figures. Moreover, below the explanation of parts identical to those in the embodiment described above are simplified or omitted.

The main point of difference between the power transmission 50 according to a first modification of the present embodiment and the power transmission mechanism 10 according to the present embodiment described above is that the start input shaft gear 41*b* is omitted, and instead of the start input shaft gear 41*b*, the input side fourth forward gear 34*a* is disposed so as to be always meshing with the start rotation shaft gear 41*a*.

Accompanying this, the input side third forward gear 33*a* and the input side fourth forward gear 34*a* are provided integrally on the input shaft 14, and the output side third forward gear 33*b* that forms a set with the input side third forward gear 33*a* and the output side fourth forward gear 34*b* that forms a set with the input side fourth forward gear 34*a* serve as idle gears that can rotate with respect to the output shaft 15, and the third or the fourth speed synchronous clutch actuated by the third or fourth speed actuator 23 is engaged and disengaged with the output shaft 15.

The third or fourth speed actuator 23 is electrically connected with the ECU 19, and either one of the output side third forward gear 33*b* or the output side fourth forward gear 34*b* is selectively engaged with the output shaft 15 by the third or fourth speed synchronous clutch, or both the output side third forward gear 33*b* and the output side fourth forward gear 34*b* are disengaged from the output shaft 15.

Thereby, the input shaft 14 and the output shaft 15 are engaged or disengaged by the third forward gear set 33 or the fourth forward gear set 34.

Figure 5:
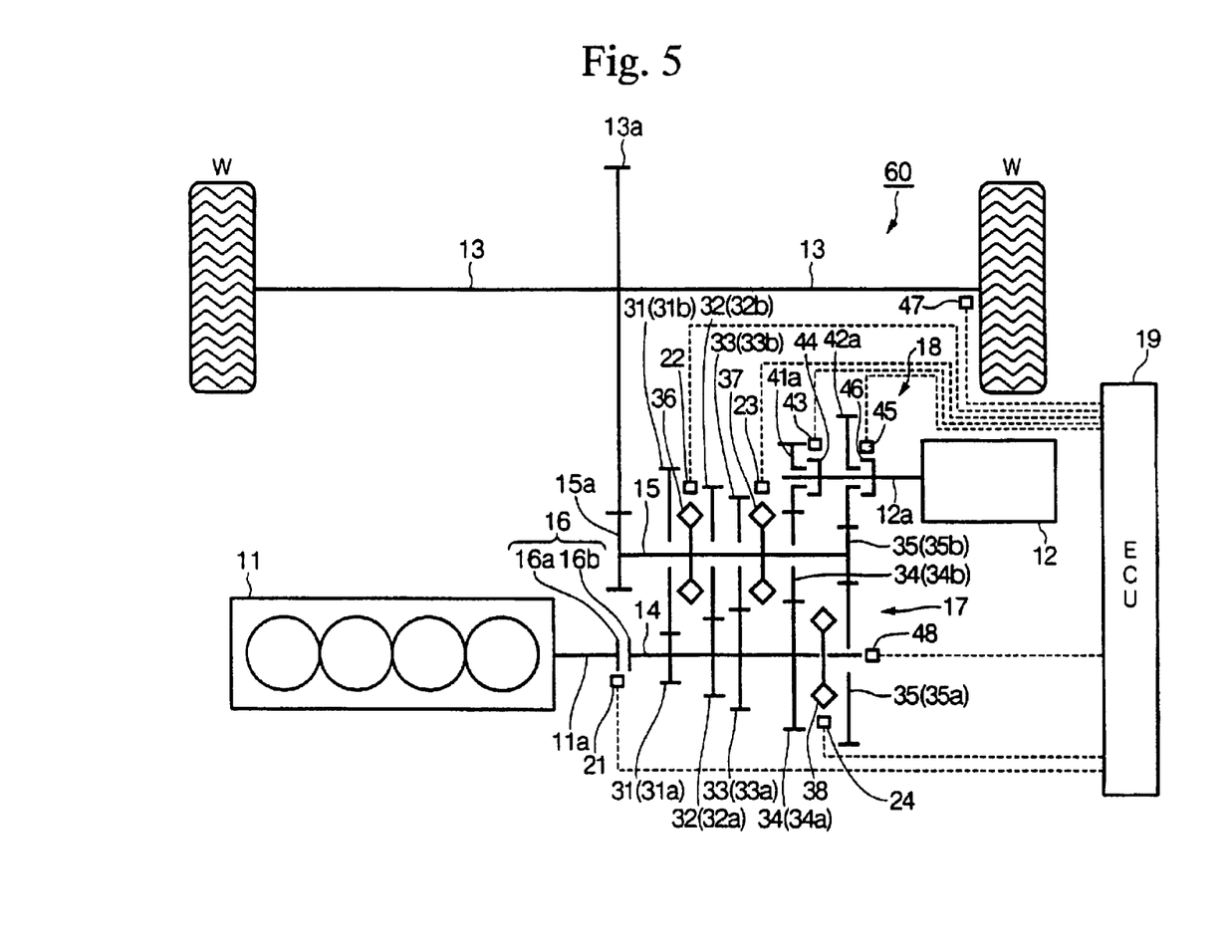
FIG. 5 is a structural drawing of the power transmission according to a second modification of the present embodiment.

In addition, in the power transmission 50 according to the first modification, the start rotation shaft gear 41*a* forms a set with the input side fourth forward gear 34*a*, the drive rotation shaft gear 42*a* forms a set with the input side fifth forward gear 35*a*, and the start rotation shaft gear 41*a* and the input side fourth forward gear 34*a*, and the drive rotation shaft gear 42*a* and the input side fifth forward gear 35*a*, which are paired together, are always meshed, but this is not limiting. For example, in the structural diagram of the power transmission 60 according to a second modification of the present invention shown in FIG. 5, the start rotation shaft gear 41*a* forms a set with the output side fourth forward gear 34*b*, the drive rotation shaft gear 42*a* forms a set with the output side fifth forward gear 35*b*, and the start rotation shaft gear 41*a* and the output side fourth forward gear 34*b*, and the drive rotation shaft gear 42*a* and the output side fifth forward gear 35*b*, which are always paired together, can be always meshed.

Figure 6:
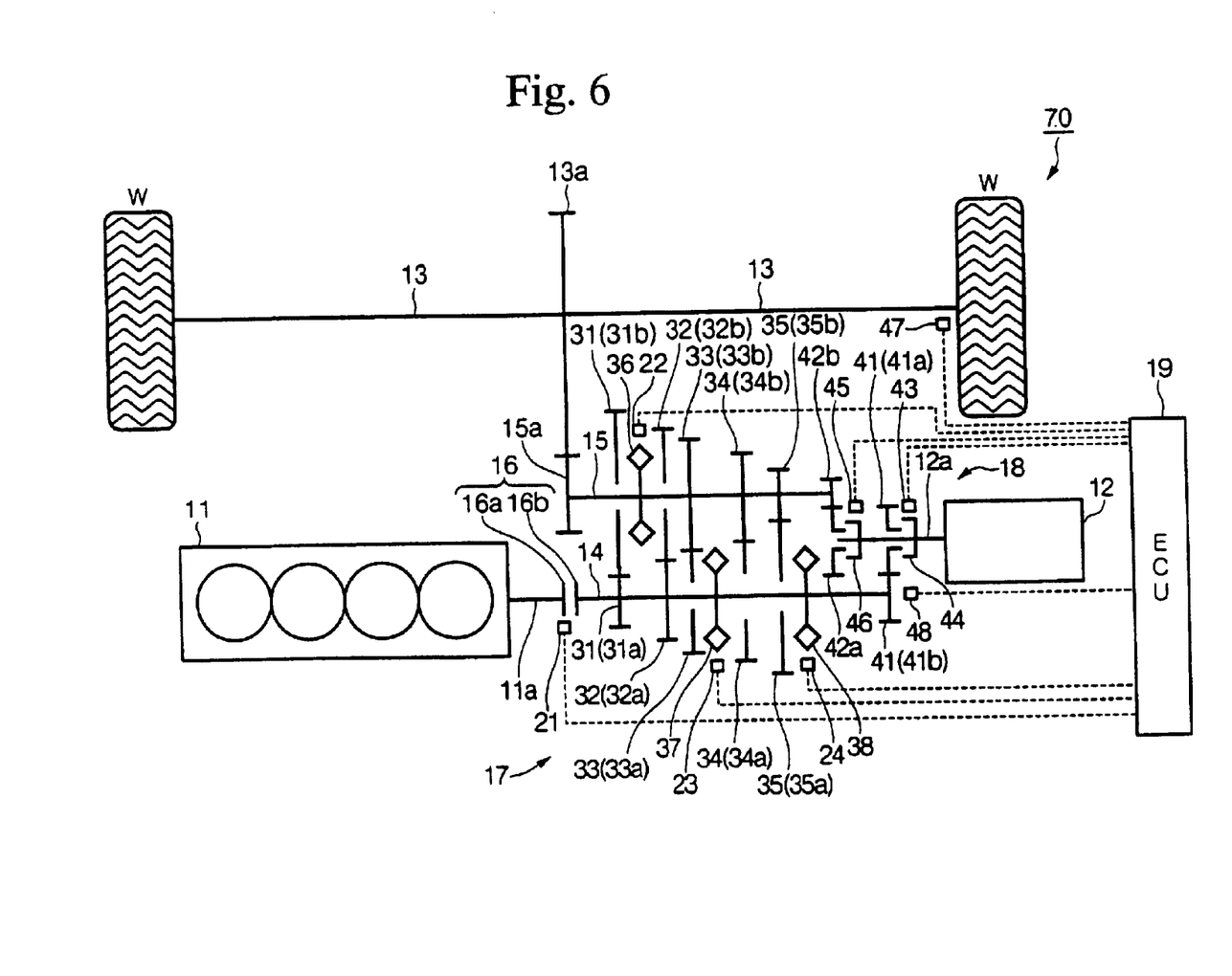
FIG. 6 is a structural drawing of the power transmission according to a third modification of the present embodiment.

Moreover, in the present embodiment, the drive rotation shaft gear 42*a* forms a set with the input side fifth forward gear 35*a*, and is always meshed therewith, but this is not limiting. In the structural diagram of the transmission 70 according to a third modification of the present embodiment shown in FIG. 6, the drive output shaft gear 42*b* that is unrelated with the transmission operation can be paired with the drive rotation shaft gear 42*a*, and can be integrally provided on the output shaft 15. In this case, the drive output shaft gear 42*b* and the drive rotation shaft gear 42*a* always mesh.

Moreover, in the present embodiment, the power is transmitted due to the meshing of each of the gears 34*a*, 35*a*, 34*b*, 35*b*, 41*a*, 42*a*, 41*b*, and 42*a*, but this is not limiting. For example, the power can be transmitted by a chain that extends between each of the gears 34*a*, 35*a*, 34*b*, 35*b*, 41*a*, 42*a*, 41*b*, and 42*a*. Furthermore, instead of each of the gears 34*a*, 35*a*, 34*b*, 35*b*, 41*a*, 42*a*, 41*b*, and 42*a*, a plurality of pulleys can be provided, and the power can be transmitted by a belt that extends over each of the pulleys.

As explained above, according a first aspect of the power transmission of the present invention, in travel mode, in which the internal combustion engine is stopped and the drive wheels are actuated by the electric motor, irrespective of the current velocity of the vehicle, it is possible to set the rotation speed of the input shaft equal to or greater than a predetermined start allowing rotation speed that can start the internal combustion engine, and without unnecessarily changing the driving force of the electrical motor transmitted to the drive wheels or impairing the driving force, the internal combustion engine can be reliably started up.

Furthermore, according to a second aspect of the power transmission of the present invention, gears or pulleys that transmit the power by rotation are provided so as to be able to rotate with respect to, for example, the rotation shaft, the input shaft, the output shaft and the like, and thereby the rotation speed ration of each of the shafts can be easily changed.

Furthermore, according to a third aspect of the power transmission of the present invention, without unnecessarily changing the driving force of the electrical motor transmitted to the drive wheels or impairing the driving force, the internal combustion engine can be reliably started up.

Furthermore, according to a fourth aspect of the power transmission of the present invention, without unnecessarily changing the driving force of the electrical motor transmitted to the drive wheels or impairing the driving force, the internal combustion engine can be reliably started up.

Furthermore, according to a fifth aspect of the power transmission of the present invention, the number of necessary members for rotation power transmission is decreased, the structure of the power transmission can be simplified, and the cost necessary for forming the power transmission can be decreased.

Furthermore, according to a sixth aspect of the power transmission of the present invention, in the travel mode in which the internal combustion engine is stopped and the drive wheels are being actuated by the electric motor, the internal combustion engine can be reliably started up by either the start-in-neutral device or the start-in-standby device depending on the current velocity of the vehicle.

What is claimed is:

1. A power transmission mechanism, in which at least one of either an internal combustion engine and an electric motor communicate with the drive wheels to transmit a driving force to said drive wheels, comprising:

a transmission comprising an input shaft that engages to said internal combustion engine, an output shaft that engages to said drive wheels, input shaft rotation power transmission members that are provided on said input shaft, and output shaft rotation power transmission members that are provided on said output shaft, and wherein said input shall and said output shaft, whose gear ratios can be changed stepwise, are engaged by selective meshing between a plurality of transmission gears including an input shaft idle gear provided on each of said input shaft and said output shaft, and the driving force of said internal combustion engine is transmitted to said drive wheels, or can disengage said input shaft and said output shaft;

a first driving force interrupting device that can engage at a variable rotation speed ratio a first rotation shaft rotation power transmission member provided on a rotation shaft of said electric motor and said output shaft rotation power transmission member provided on said output shaft, and can transmit the driving force of said electric motor to said drive wheels;

a second driving force interrupting device that engages a second rotation shaft rotation power transmission member provided on said rotation shaft and said input shaft rotation power transmission member provided on said input shaft, and can transmit the driving power of said electric motor to said internal combustion engine; and an interrupt control device that actuates at least one of said first driving force interrupting device and said second driving force interrupting device, wherein, when a vehicle is in a travel made in which the internal combustion engine is stopped and the vehicle is driven by the electric motor at a velocity higher than a predetermined velocity, the internal combustion engine is started in response to a sudden demand for starting the internal combustion engine by connecting the rotation shaft of the electric motor with the output shaft by actuating the first driving force interrupting device, and the output shaft and the input shaft of the internal combustion engine are connected at an appropriate gear ratio in the transmission while the second driving force interrupting device is not actuated, and when the vehicle is in a travel mode in which the velocity of the vehicle is less than a predetermined velocity, such as near zero, and the internal combustion engine is stopped, the internal combustion engine is started in response to the sudden demand for starting the internal combustion engine by connecting the rotation shaft of the motor with the input shaft of the internal combustion engine through the input shaft idle gear by actuating the second driving force interrupting device while the rotation shaft of the electric motor is connected with the output shaft at a variable transmission rotation speed by actuating the first driving force interrupting device and the rotation speed of the electric motor is increased until a predetermined engine start allowing speed.

2. A power transmission mechanism according to claim 1, wherein said first rotation shaft rotation power transmission member, said second rotation shaft rotation power transmission member, said input shaft rotation power transmission member, and said output shaft rotation power transmission member are gears or pulleys that transmit power by rotating.

3. A power transmission mechanism according to claim 1, wherein:

said input shaft rotation power transmission member comprises an input shaft gear that is integral to said input shaft and an input shaft idle gear that can rotate with respect to said input shaft;

said output shaft rotation power transmission member comprises an output shaft gear that is integral to said output shaft;

said first driving force interrupting device engages said first rotating shaft rotation power transmitting member to said output shaft gear via said input shaft idle gear; and said second driving force interrupting device engages said second rotation shaft rotation power transmission member to said input shaft gear.

4. A power transmission mechanism according to claim 3, wherein said input shaft gear is said transmission gear provided on said input shaft.

5. A power transmission mechanism according to claim 1, wherein:

said input shaft rotation power transmission member comprises an input shaft gear that is integral to said input shaft;

said output shaft rotation power transmission member provides an output shaft gear that is integral to said output shaft and an output shaft idle gear that can rotate with respect to said output shaft;

said first driving force interrupting device engages said first rotation shaft rotation power transmission member to said output shaft gear; and said second driving force interrupting device engages said second rotation shaft rotation power transmission member to said input shaft gear via said output shaft idle gear.

6. A power transmission mechanism according to claim 5, wherein said input shaft gear is said transmission gear provided on said input shaft.

7. A power transmission mechanism, in which at least one of an internal combustion engine and an electric motor communicate with the drive wheels to transmit a driving force to said drive wheels, comprising:

a transmission comprising an input shaft that engages to said internal combustion engine, an output shaft that engages to said drive wheels, input shaft rotation power transmission members that are provided on said input shaft, and output shaft rotation power transmission members that are provided on said output shaft, and wherein said input shaft and said output shaft, whose gear ratios can be changed stepwise, are engaged by selective meshing between a plurality of transmission gears provided on each of said input shaft and said output shaft, and the driving force of said internal combustion engine is transmitted to said drive wheels, or can disengage said input shaft and said output shaft;

a first driving force interrupting device that can engage at a variable rotation speed ratio a first rotation shaft rotation power transmission member provided on a rotation shaft of said electric motor and said output shaft rotation power transmission member provided on said output shaft, and can transmit the driving force of said electric motor to said drive wheels;

a second driving force interrupting device that engages a second rotation shaft rotation power transmission member provided on said rotation shaft and said input shaft rotation power transmission member provided on said input shaft, and can transmit the driving power of said electric motor to said internal combustion engine; and an interrupt control device that actuates at least one of either said first driving force interrupting device or said second driving force interrupting device;

an engaging/disengaging device that is provided between said internal combustion engine and said transmission, and engages or disengages said internal combustion engine and said transmission;

a start-in-neutral device wherein, in the state in which the driving force of said electric motor is transmitted to said drive wheels by said first driving source interrupting device, and said input shaft and said output shaft are disengaged by said transmission, and said internal combustion engine and said transmission are disengaged by said engaging/disengaging device, and said rotation shaft and said input shaft are engaged by said second driving force interrupting device, the rotation speed of said electric motor is set such that, when said internal combustion engine and said transmission are engaged by said engaging/disengaging device, the rotation speed of said input shaft is equal to or greater than a predetermined rotation speed that allows starting of said internal combustion engine, and said internal combustion engine is started up by engaging said internal combustion engine and said transmission by said engaging/disengaging device, or in the state in which the driving force of said electric motor is transmitted to said drive wheels by said first driving force interrupting device, and said input shaft and said output shaft are disengaged by said transmission, and said internal combustion engine and said transmission are engaged by said engaging/disengaging device, and said rotation shaft and said input shaft are disengaged by said second driving force interrupting device, the rotation speed of said motor is set such that, when said rotation shaft and said input shaft are engaged by said second driving force interrupting device, the rotation speed is equal to or greater than a predetermined rotation speed that allows the start of said internal combustion engine, and said internal combustion engine is started up by engaging said rotation shaft and said input shaft by said second driving power interrupting device;

a transmission control device wherein, in a state in which the driving force of said electric motor is transmitted to said drive wheels by said first driving force interrupting device, and said internal combustion engine and said transmission are disengaged by said engaging/disengaging device, said gear ratio is set according to a velocity of the vehicle such that, when said input shaft and said output shaft are engaged by said transmission, the rotation speed of said input shaft is equal to or greater than a predetermined rotation speed that allows the start of said internal combustion engine, and said input shaft and said output shaft are engaged by said transmission;

a start-in-standby device wherein, in a state in which the driving force of said electric motor is transmitted to said driving wheels by said first driving force interrupting device, and said internal combustion engine and said transmission are disengaged by said engaging/disengaging device, when a start request for said internal combustion engine is generated, at that point in time said input shaft engaged to said output shaft by said transmission control device and said internal combustion engine are engaged by said engaging/disengaging device; and an internal combustion engine start control device that operates by selecting either said start-in-neutral device or said standby start device depending on said velocity of the vehicle.

* * * * *